US012708921B1

(12) United States Patent
Garrett

(10) Patent No.: US 12,708,921 B1
(45) Date of Patent: Aug. 18, 2026

(54) ADJUSTABLE, MOVABLE, MULTI-DIRECTIONAL WATERING SYSTEM

(71) Applicant: Cameron Garrett, Oxford, MS (US)

(72) Inventor: Cameron Garrett, Oxford, MS (US)

( * ) Notice: Subject to any disclaimer, the term of this patent is extended or adjusted under 35 U.S.C. 154(b) by 0 days.

(21) Appl. No.: 18/076,846

(22) Filed: Dec. 7, 2022

(51) Int. Cl.
*B05B 15/62* (2018.01)
*B05B 3/04* (2006.01)

(52) U.S. Cl.
CPC ................ *B05B 15/62* (2018.02); *B05B 3/04* (2013.01)

(58) Field of Classification Search
CPC .................................. B05B 15/62; B05B 3/04
USPC ......................................... 239/276, 273, 201
See application file for complete search history.

(56) References Cited

U.S. PATENT DOCUMENTS

| | | | | | |
|---|---|---|---|---|---|
| 471,156 | A * | 3/1892 | Tinsley | B05B 15/625 | 248/82 |
| 2,084,817 | A * | 6/1937 | Lombard | B05B 3/06 | 40/538 |
| 2,092,426 | A * | 9/1937 | Riddell | A47K 3/38 | 248/231.71 |
| 2,592,053 | A * | 4/1952 | Megla | D06F 1/00 | 248/79 |
| 2,602,618 | A * | 7/1952 | Cohen | A01K 87/06 | 248/516 |
| 2,711,927 | A * | 6/1955 | Miller | B05B 15/622 | 239/588 |
| 2,942,822 | A * | 6/1960 | Crow | B05B 15/622 | 239/276 |
| 3,204,902 | A * | 9/1965 | David | F16L 3/003 | 248/231.71 |
| 4,256,262 | A * | 3/1981 | Rosenberg | B05B 15/622 | 239/276 |
| 4,659,015 | A * | 4/1987 | Rosenberg | B05B 15/40 | 239/600 |

* cited by examiner

*Primary Examiner* — Qingzhang Zhou
(74) *Attorney, Agent, or Firm* — William S. Parks

(57) ABSTRACT

Water delivery systems and devices that are attachable and detachable from water sources (hoses) on one end and provide interchangeable components as selected watering extensions from the other are disclosed. Such a system and/or device is provided as an intermediary structure that allows for selected placement and clamping on different solid articles to permit directional water delivery via the water source, through the system and/or device, and outwardly through a selected watering extension. Such placement and clamping are available to a user in terms of any desired location as well as at any angle/direction, thereby allowing the user versatility in utilization. With any selected watering extension also available, more efficient and effective water delivery is permitted as well. Such an intermediary device further includes an internal channel from water source connection to water extension connection.

4 Claims, 9 Drawing Sheets

ADJUSTABLE, MOVABLE, MULTI-DIRECTIONAL WATERING SYSTEM

FIELD OF THE DISCLOSURE

The present disclosure relates generally to water delivery systems and devices that are attachable and detachable from water sources (hoses) on one end and provide interchangeable components as selected watering extensions on the other. Such a system and/or device is provided with an intermediary structure that allows for selected placement and clamping on different solid articles to permit directional water delivery via the water source, through the system and/or device, and outwardly through a selected watering extension. Such placement and clamping are available to a user in terms of any desired location as well as at any angle/direction, thereby allowing the user versatility in utilization. With any selected watering extension also available, more efficient and effective water delivery is permitted as well. Such an intermediary device further includes an internal channel from water source connection to water extension connection.

BACKGROUND OF THE PRIOR ART

Water delivery is crucial for controlled agricultural maintenance and has proven more and more important as climate concerns have altered the ecological landscape around the globe. As it concerns individual homes and real estate, many people enjoy the benefits of either or both of gardens (for growing food) and vegetation (landscaping) for beautification purposes. In such situations, water delivery has proven invaluable as rain is not always reliable (and climate changes have proven difficult to predict in certain regions). The necessity of nutrients and water for vegetation is well known, certainly. The potential for scarcity of such a natural resource may endanger the health of such flora as such conditions worsen, as well. As a result, garden, lawn, shrub, and even tree maintenance regimens require improvements in water delivery for such issues.

For individual homes and potentially for smaller agricultural outfits (small farms, vineyards, etc.), irrigation or sprinkler systems have been utilized in the past. Typically, irrigation requires a controlled and prepared configuration of pipes, trenches, and the like to manipulate water from a source to individual plant locations. Sprinklers and like devices have provided different temporary and movable procedures for such water delivery on demand. Such sprinklers are generally provided with circular (rotational) or rectangular directions of water transfer (outwardly from a sprinkler device that rotates a certain direction and distance then returns to rotate again or from an oscillating device that sprays water as it moves back and forth repeatedly). Such devices depend on water pressure and placement for effectiveness as the general placement capabilities are either flat on the ground (and thus limited to certain directional delivery) or optionally raised on a tripod or like stand that places the sprinkler head at a height but parallel to the same ground-based sprinkler. In other words, actual directional capabilities are rather limited and the potential for watering undesirable areas due to the difficulty of controlled the water trajectory from such ground- or tripod-based devices could lead to problems, overall, and more importantly, perhaps, the potential for wasting water resources due to a lack of delivery control, at least in terms of actual targeting of water delivery at certain water pressures and thus questionable effectiveness overall.

As such, there exists a need to provide a water delivery device, tool, and/or system that takes into consideration the necessity of placement and direction for efficiency reasons, particularly as water may prove more and more scarce in the future. Additionally, the facilitation of providing a single unit device that allows for selected delivery capabilities as well as attachment with solid articles within an agricultural landscape for disposition thereof at any angle for such on-demand water delivery would be particularly beneficial. A simplified and reliable system/device of this type has not been accorded the industry to date, however. This disclosure provides a significant step forward in this particular area. Consequently, those skilled in the art will appreciate the present disclosure in this respect.

ADVANTAGES AND SUMMARY OF THE DISCLOSURE

A notable advantage of the disclosed water delivery device is the capability of attaching/clamping the same to any location in order to provide water therefrom at any angle, ostensibly allowing for water delivery in a manner that has been unexplored. Another advantage thereof is the provision of a single structure intermediary device that includes a hose/water source component on one end, a single straight channel within the structure that leads to an opposing end with a sprinkler or like interchangeable delivery device attached thereto. Yet another advantage is the presence of the clamping component within the single structure of the intermediary device, thereby providing a single article that merely requires hose attachment and proper water delivery component attachment on opposing ends for water source delivery while simultaneously allowing for movability and placement (securely) to a solid article for directional delivery of such water on demand.

Accordingly, this disclosure encompasses a water delivery device comprising an intermediary unitary structure having a three-dimensional configuration with i) a first plane including a water source attachment component leading from a first end thereof and a water delivery component leading from a second opposing end thereof, wherein said first and second ends thereof are connected through an internal channel within said intermediary structure, ii) a second plane substantially perpendicularly disposed in relation to said first plane, said second plane including a clamp component with a movable arm, a collar positioned at a first end of said second plane through which said movable arm passes and moves, an adjusting top end of said movable arm, a clamp surface bottom end of said movable arm, and a non-moving base clamp end positioned at a second end of said second plane. The clamp may be a screw-type clamp or a pressure-based clamp and permits placement and secured attachment to a properly situated article (post, stanchion, and the like) for versatile location of the overall device for water delivery in any direction and manner on demand. The water source may be a hose that has a properly screw-alignment with the first end attachment component. The water delivery component may be any type of sprinkler, oscillating structure (with openings for water egress) or other similar type of structure.

The single channel within the single unitary intermediary device allows for facilitation of connection and, with the clamp component(s), simplified placement overall for the water delivery system. As well, such a single channel allows for reliable water source transfer to the water delivery component of the intermediary device without any need for external concerns of, for instance, water pressure change, leakage, etc., to best ensure optimal performance.

Furthermore, the directional configurations of the clamp as compared with the water delivery components permits the aforementioned beneficial capabilities of placement and directional water delivery on demand. In other words, with the first plane of the intermediary device having the water source, single internal channel, and water delivery component(s) all in one direction, and the clamping component(s) all present on the intermediary device in a second plane perpendicularly disposed in relation to the first plane, a user may choose to clamp the intermediary device (with such water source and water delivery components present) on a post, stanchion, fence, branch, pole, etc., as desired to determine the best direction for water delivery to most effectively provide such a water source to a target location (lawn, garden, tree, shrub, any fauna, basically) to avoid excess watering of other locations (particularly if any other location is to be left unwatered or requires a different water level that may be undertaken with the same overall device/system but at a different angle/disposition and thus from a different base structure or at a different placement on or along the same post, pole etc., as utilized previously). In any event, such an intermediary structure as disclosed above basically permits such varied water delivery directions for efficiency and effectiveness on demand.

For purposes of this disclosure, the term "substantially" is used herein as a modifier of certain disposed angles/directions/etc., in relation to the inventive device. As such, and throughout this disclosure, the term "substantially perpendicular" or "substantially parallel" are intended to allow for such minor variations since manufacturing or even design differences may be possible without avoiding the actual scope of the invention as intended. Likewise, the terms "horizontal" and "vertical" may be construed as "substantially horizontal" or "substantially vertical" for purposes of this invention. Additionally, it should be understood that the device may be disposed of at a "nearly horizontal" or like angle during use depending on the selective actions of the user, either in relation to the surface chosen for placement of the device and/or the utilization of certain extended feet components that may allow for differing angles of placement in such a manner. In any event, again, such potential embodiments are well within the purview of the ordinarily skilled artisan when reviewing this disclosure and thus are all to be considered within the scope of the invention as well.

Such a water delivery system thus allows for placement of an intermediary article structure having connected thereto a water source and an opposing water delivery component onto any suitable structure through the utilization of a clamp component disposed perpendicularly from the direction of the water source/delivery component. Such a configuration allows for both the placement of the intermediary structure at any suitable location and in any on-demand direction for more efficient usage and positioning for direct introduction as needed for the target flora/vegetation involved. Also, the ability to provide selected water delivery components allows for even more controlled water delivery capabilities as different devices require, to some degree, at least, different water pressure levels for effective utilization as well as potentially less water amounts for effective watering of target flora/vegetation. The further presence of a single channel internally provided within the single unitary intermediary structure accords further control and more reliable pressure effects during utilization, at least, not to mention facilitation of use and manufacture, as well.

Such an intermediary structure is thus as described broadly above including a portion with the water delivery capability therein with a first end having a threaded or complementary snap connector for connection with a water source (hose, and the like). The water source may thus be easily connected in a reliable manner through screw-on or snap-on action in order to provide the water for eventual directed delivery through the opposing end water delivery component. Such a component may thus be screwed, snapped, or otherwise reliably connected to the opposing second end of such a water delivery portion of the intermediary structure. The connectable nature of such a water delivery component thus allows for selective utilization of any type of article of this nature, whether a rotating (full or return in partial movement) sprinkler head, an oscillating device with water egress holes, or any other type (including, without limitation, an extending sprinkling head that protrudes from a base upon application of sufficient water pressure thereto, with water delivery in a full 360 degree manner or, if desired, limited to 180 degrees or lower, again allowing for selected directional delivery) for on-demand trajectory and distance of such watering activities. The single internal channel from water source to water delivery component is provided within the same plane from the first end to the second end in this manner, as well.

The disposition of such a water delivery component (in a first plane within the intermediary structure) allows for such directional capabilities, certainly. A user may decide to simply attach such a device to a desired solid structure (such as, without limitation, on a raised platform) and allow for watering to commence, of course. However, further provided herein this disclosure is, within the same single unitary intermediary structure a clamp component that is disposed perpendicularly thereto such a water delivery component in order to allow for attachment to any suitable (resilient and strong, for example) structure external to the intermediary structure. Such attachment externally thus allows for further disposition of the entire intermediary structure (and thus entire water delivery system) at any angle and direction for selected trajectory of water upon operation of the water source through the intermediary structure to the water delivery component. Such a clamp is thus provided in a second plane that is, again, perpendicularly from that of the water delivery component within the unitary intermediary structure. Such a clamp may be a C-clamp with a screw-on or pressure-based maneuverable bar that provides a closure between two distinct arms for reliable connection to the aforementioned external structure (which may itself be provided at any position and/or angle).

The unitary intermediary structure of the overall water delivery system and/or device thus may be made from any resilient material that can withstand repeated utilization and movement to different locations and different positions, as well as withstand internal pressures of water therein during utilization for water delivery purposes. Steel, brass, stainless steel, iron, aluminum, and the like, are potentially preferred with other alloys possible, certainly. The further ability to provide the internal channel in the water delivery component plane (portion) is of necessity for appropriate utilization of the easy-to-use intermediary structure, as well. The water source end of the water delivery portion plane includes a suitable adapter (threaded, snap-in, snap-receive, etc.) for water source (hose, etc.) connection; such an adapter may be made from brass, stainless steel, and the like, for such a purpose. Of course, such an adapter allows for interchangeable water source connections thus permitting different hoses, etc., to be utilized for such an operation. The opposing end with the water delivery component (sprinkler, and the like) includes its own adapter for connection thereto for interchangeability with different types on demand. Metals, such as, without limitation, brass, stainless steel, aluminum, and the like, as well as plastics, including, again, without limitation, thermoplastics, such as ABS, PVC, polypropylene, polyacrylics, polymethylmethacrylate, polycarbonate, nylon, and the like, may be utilized as materials for such an adapter, with threaded connections, snap-on connections, clamped connections, and the like, present, as well, for such a purpose.

The clamp portion of the unitary intermediary structure extends from a base body of the structure and is, as noted above, disposed perpendicularly to the direction of the water delivery portion of the intermediary structure. A first arm is provided that includes a bore through which a clamp rod is disposed for movement from the opening thereof to a second lower arm opposite the first arm. The clamp rod may include a contact end to abut against an external structure (which the second arm to abut against an opposing side of such an external structure) for reliable placement in attachment thereto at a selected location. Such arms of this clamp portion may be provided through soldering (or like attachment) of pre-manufactured articles thereof to a base intermediary structure. The bore of the first arm may be threaded or simply circular (cylindrical) in configuration to permit movement (screw or pressure) along the second plane of the intermediary structure for the contact end to abut an external structure, etc., as noted above. The clamp rod may be tightened through screwing or pressure application to the external structure for secure attachment and, if desired, may be prevented from loosening therefrom through further locking at the bore of the first arm. Steel, stainless steel, brass, aluminum, iron, and the like, may be utilized as materials for such clamp arms, with the same materials possible for the clamp rod, as well. The contact end may be provided as a metal, as well, or, preferably, provided with a rubber or like softer, resilient material for pressure application and grip to such an external structure upon attachment/connection thereto.

The full integration of clamp portion and water delivery portion within the unitary intermediary structure allows for facilitation of utilization by a user in this respect. The selection of water source and water delivery component is permitted with the ability attach/connect the intermediary structure through the clamp to any external structure (post, pole, branch, fence, etc.) for positioning on demand. A user may actually decide to attach/connect such an intermediary structure initially to a selected location followed by connection to a water source and then utilization thereof. Selection of the water delivery component may be made in this manner, as well. In any event, a user has versatility in terms of placement of the water delivery device (through the single unitary intermediary structure) and the ability to decide what type of water delivery component to be utilized and the type/amount of water (pressure as well) to be activated. Such a unique system thus allows for selected water delivery in terms of direction, trajectory, water pressure, delivery component capability, and location. Such capabilities all simultaneously with and within a single water delivery system structure has heretofore been unexplored.

BRIEF DESCRIPTION OF THE DRAWINGS

This disclosure will be better understood and objects other than those set forth above will become apparent when consideration is given to the following detailed description thereof. Such description makes reference to the annexed drawings wherein.

DETAILED DESCRIPTION OF THE DRAWINGS AND PREFERRED EMBODIMENTS

The following drawings and descriptions are not intended to limit the breadth and scope of the invention in any manner. As such, the embodiments provided herein are merely preferred and not the extent of the described invention.

Figure 1:
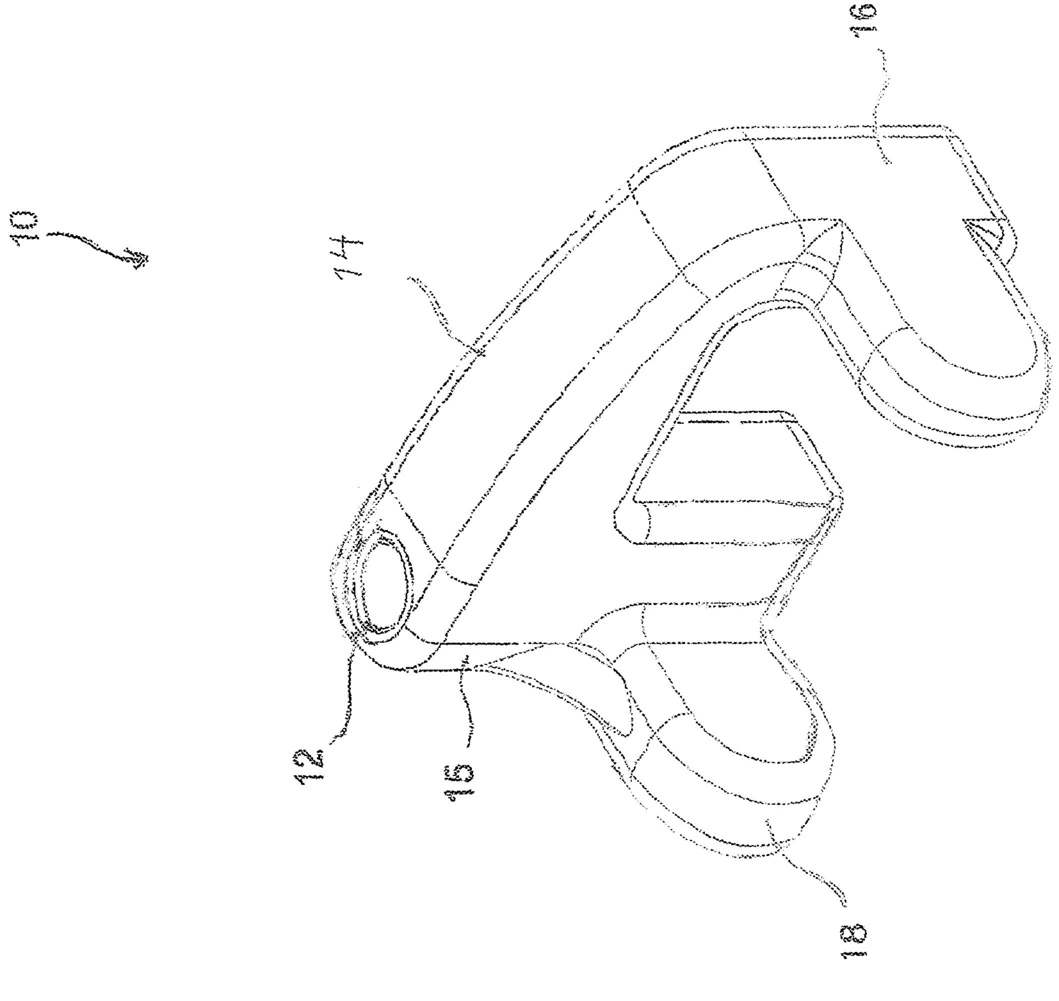
FIG. 1 depicts an isometric view of one potentially preferred embodiment of an intermediary device of the system disclosure.
Figure 2:
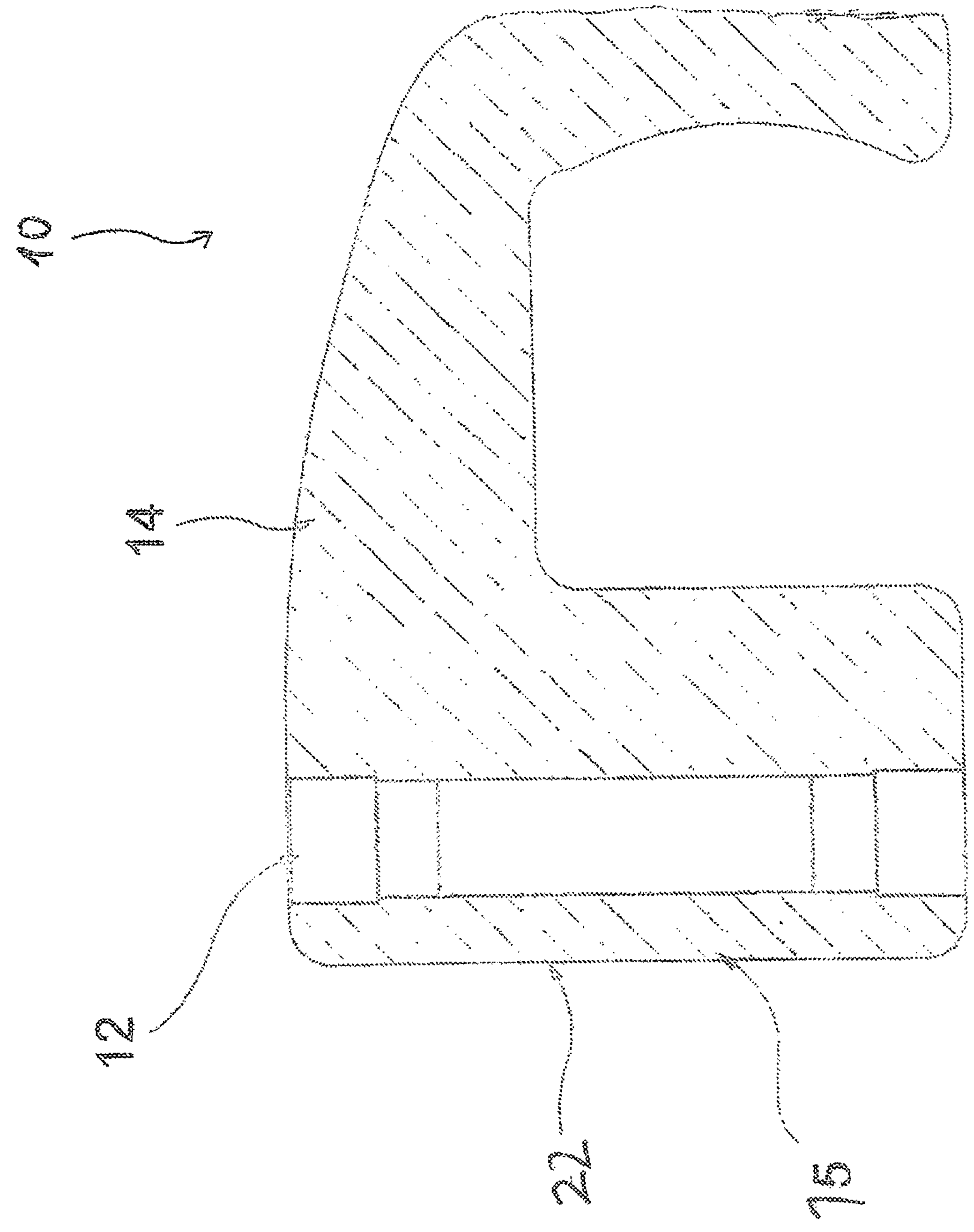
FIG. 2 depicts a side, cutaway view of the intermediary device of FIG. 1.
Figure 3:
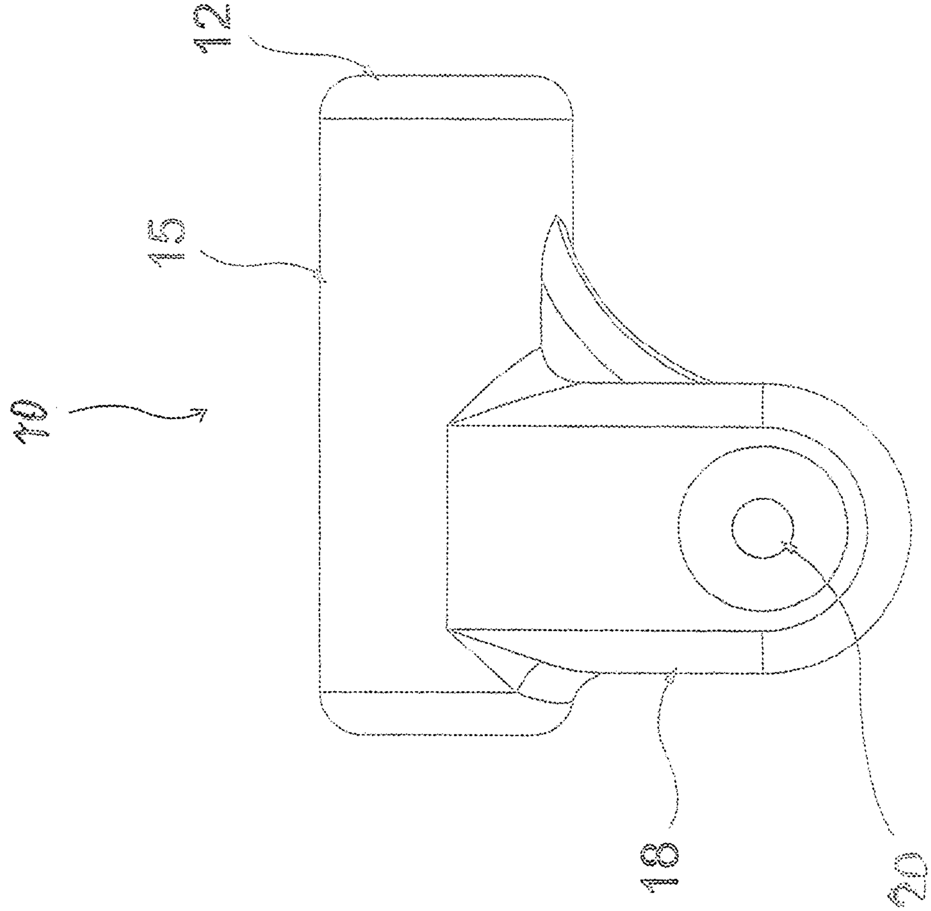
FIG. 3 depicts a short side view of the intermediary device of FIG. 1.

FIGS. 1, 2, and 3 provide differing positional views depicting a single unitary intermediary device 10 as disclosed herein and prior to attachment of a water source inlet extension as well as an extension or actual water delivery component thereto. Such a device 10 is, as noted, a single structure with a top opening 12 that leads to an integrated channel (22 of FIG. 2, for instance), a top arm 14 leasing to a buttress arm 16 substantially perpendicularly disposed to the top arm, and a further extending arm 18 including an opening for a movable/rotating shaft (32 of FIG. 4, for example), said extending arm further present on an external arm 15 housing the channel (22) and disposed perpendicular thereto such an external arm 15. Such an intermediary device 10 includes openings 12, 12A that allow for attachment of a water source inlet (24 of FIG. 4) and an adapter or direct connection (26 of FIG. 4) of a water delivery component (such as a sprinkler head 28 in FIG. 4). Such an intermediary device 10 provides significant benefits for a user by permitting differing water sources as well as water delivery components on demand. The channel (22) within the external arm 15 allows for controlled connections and water directions (as well as retained water pressures, at least) during utilization thereof, as well.

Figure 4:
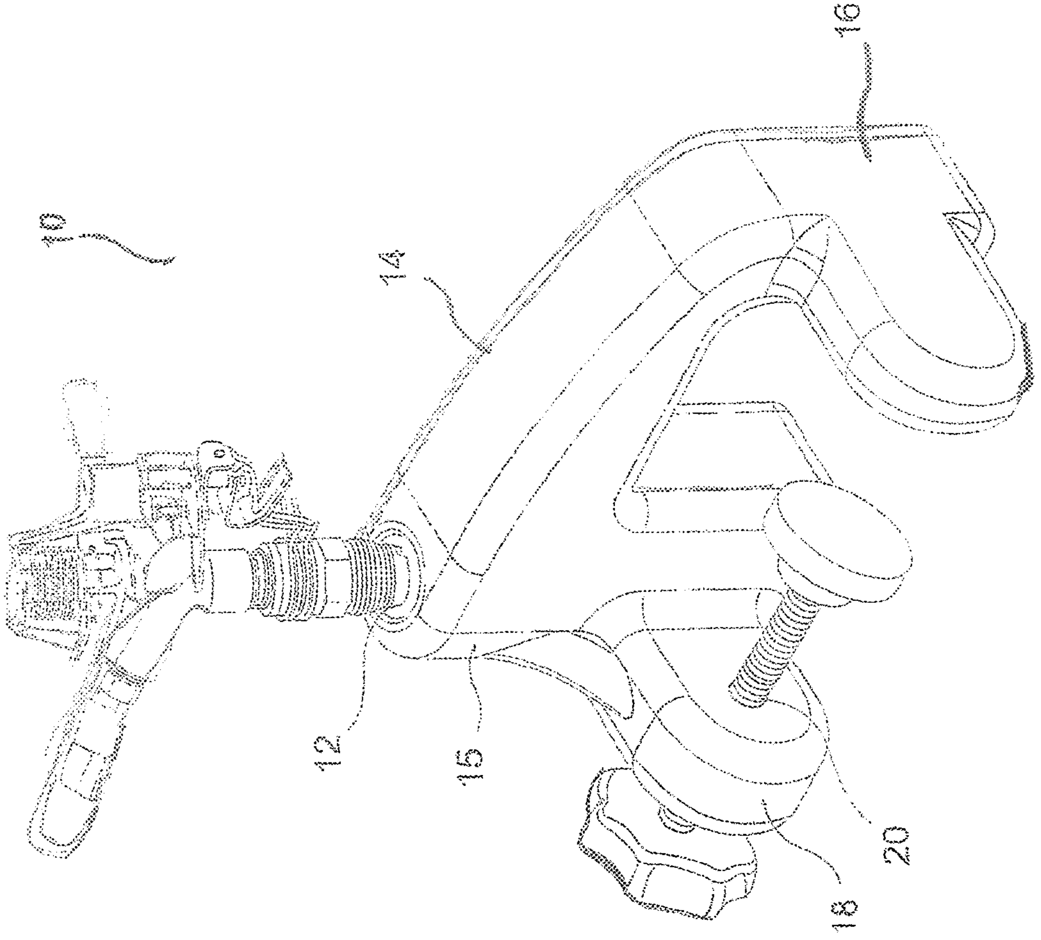
FIG. 4 depicts an isometric view of the attachment of the intermediary device of FIG. 1 to a water source inlet and to a water delivery component (partially rotating sprinkler head).

FIG. 4 provides a view of an entire placeable, repositionable (at any desired angle and location) and movable water delivery device 100 with a water source inlet 24 and a sprinkler head 28 as the water delivery component. Also shown are the movable manipulatable arm 32 (here a threaded rod for screw movement and tightening purposes) with a clamp end 34 for contact with a solid surface (with the buttress arm 16 provided an opposing force on the other side of such a solid structure to aid in retention thereto), as well as a tightening head 30 for actual screw application for tightening to be achieved.

Figure 5:
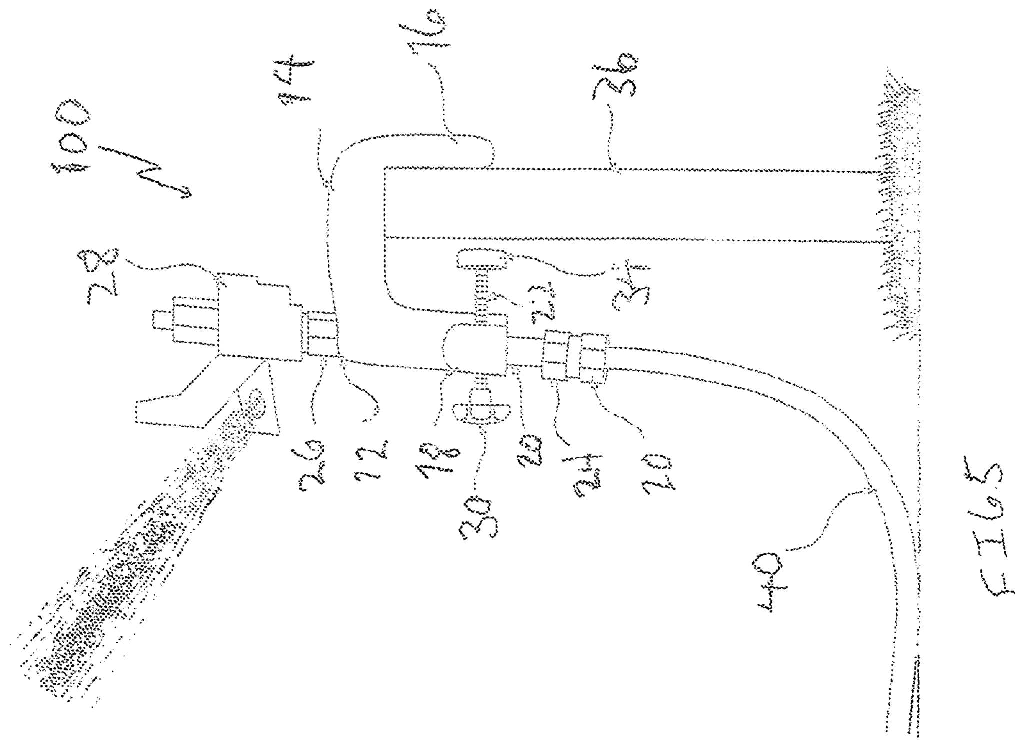
FIG. 5 depicts the attachment of the intermediary device of FIG. 1 to a water source at the water source inlet, a partially rotating sprinkler head as the water delivery component, and a solid base article for water delivery utilization at a selected direction.

FIG. 5 shows the placement, attachment, and tightening of the overall device 100 around a solid structure 36 (here a fence, for instance). A water hose 40 is attached thereto through a threaded head 38 to the water source inlet 24 of the device 100 (and the fence 36 and hose 40 are in contact with the ground 42) which, when activated for operating with water sourcing in effect, introduces water into the device 100 at the lower opening 12A leading through the channel (22 of FIG. 2) through the top opening 12 and into the sprinkler 28 via the sprinkler connection 26. In this manner, the clamping capability provided by the device 100 allows for such placement with a selected direction permitted for the sprinkler 28 on demand. Certainly, though, the ability to move such a device 100 to any location as desired where a suitable solid structure is present and dispose the device 100 at any angle for delivery of such water through the sprinkler 28 (or any selected water delivery component) is permitted through the single unitary intermediary structure disclosed herein. The further figures provide some different, non-limiting, alternatives for such a single unitary intermediary device to provide versatility in terms of the utilization of any water delivery component at any disposed angle/direction/etc., on demand.

Figure 6:
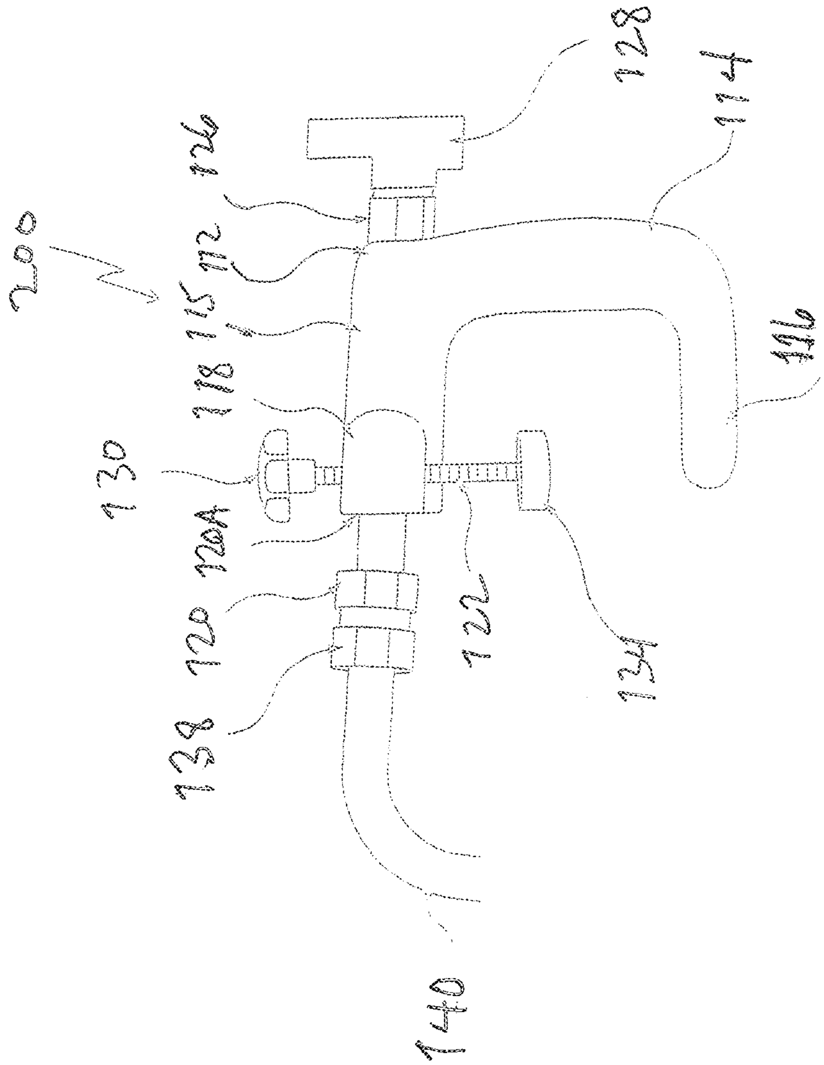
FIG. 6 depicts the attachment of the intermediary device of FIG. 1 to a water source and a different, interchangeable sprinkler head water delivery component than in FIG. 5.

Thus, FIG. 6, for instance, provides a different possible device 200 through the interchangeable capability of removing the sprinkler 28 of FIG. 5 and replacing with a flat head sprinkler water delivery component 128 through a connection 126 to the top opening 112 of the channel arm 115. As above, a top arm 114 leads to a buttress arm 116, while the channel arm 115 includes a perpendicular extension 118 having a bore through which a movable rod 122 is present with a clamp end 134 and a tightening head 130. A water source inlet 124 is present at the bottom opening 112A of the channel arm 115, with a water source (hose) 140 connected thereto through a threaded end 138.

Figure 7:
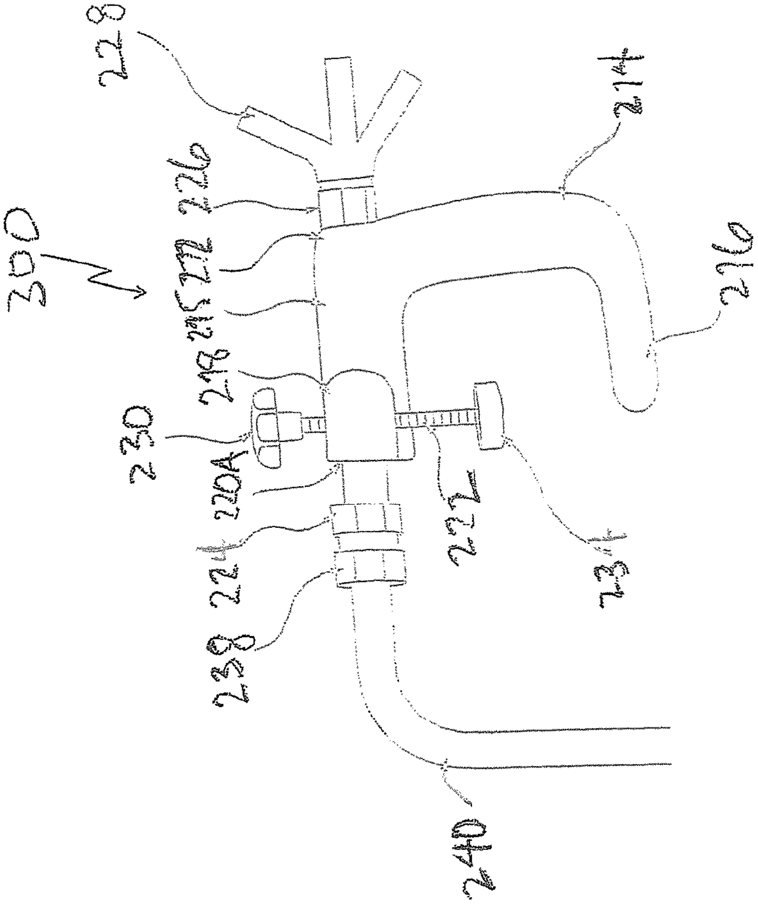
FIG. 7 depicts the intermediary device of FIG. 1 but with a different, interchangeable three-armed rotating water delivery component present attached thereto.

FIG. 7 provides a similar device 300 with a fully rotating sprinkler head 228 attached at the top opening 212 of the channel arm 215, through a connection 226. A top arm 214 leads to a buttress arm 216, with an extension 218 leading perpendicularly from the channel arm 215 and including, as above, a bore through which a movable rod 222 is present with a clamp end 234 and a tightening head 230. A water source inlet 224 is present at the bottom opening 212A of the channel arm 215, with a water source (hose) 240 connected thereto through a threaded end 238. Thus, such a single unitary intermediary structure (10 of FIGS. 1-3) provides versatility overall for the utilization of various different water delivery components on demand, while also permitting placement, repositioning, and moving (with reliable and secure attachments) in relation to solid structures for directional water delivery as needed.

Figure 8:
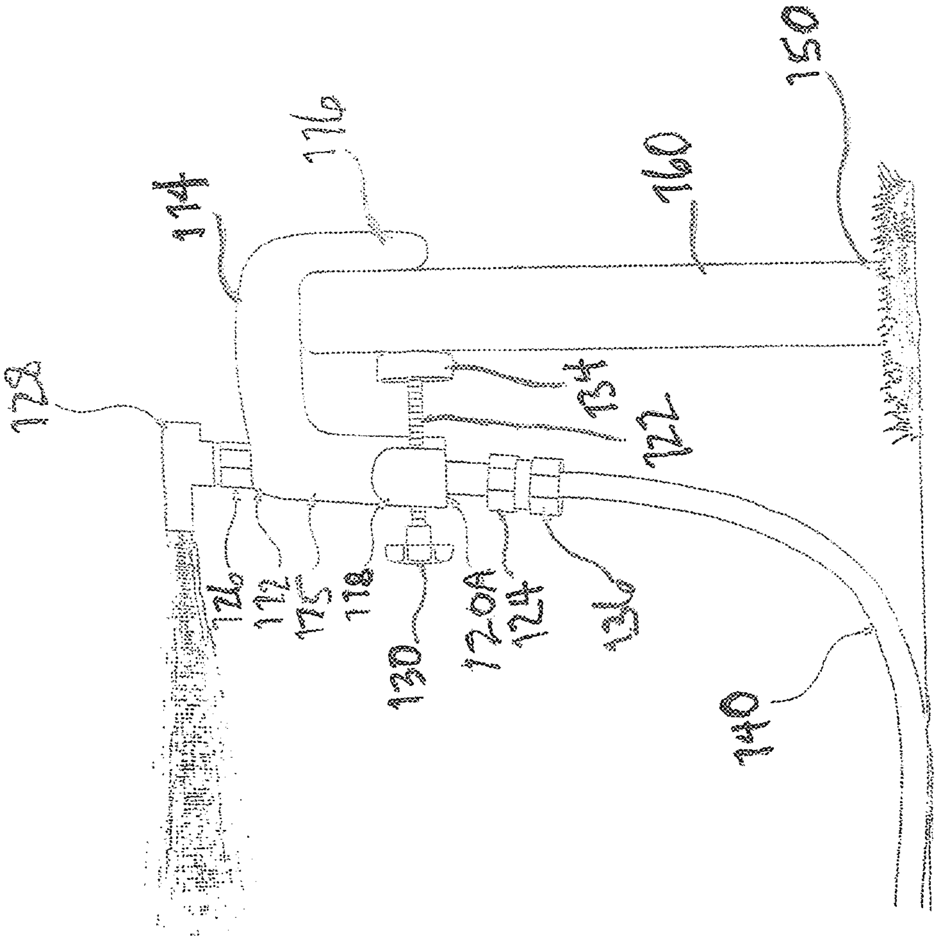
FIG. 8 depicts the attachment of the entire device of FIG. 6 to a water source and vertical solid base article for water delivery utilization thereof.

FIG. 8 shows the ability to position the device 200 of FIG. 6 on, in this instance, a vertical post 160. The buttress arm 116 is placed over the top edge of the post 160 with the clamp 134 moved through the movable rod 122 through tightening of the head 130 until the buttress arm 116 and clamp 134 secure to the opposite side of the post 160. The positioning of the device 200 in this manner allows, in this instance, the rotating sprinkler 128 to provide water at a height and in a direction as determined by the user. The water source 140 and the post 160 are on the ground 150, but the sprinkler 128 is not, allowing for a unique manner of delivery water at such a location.

Figure 9:
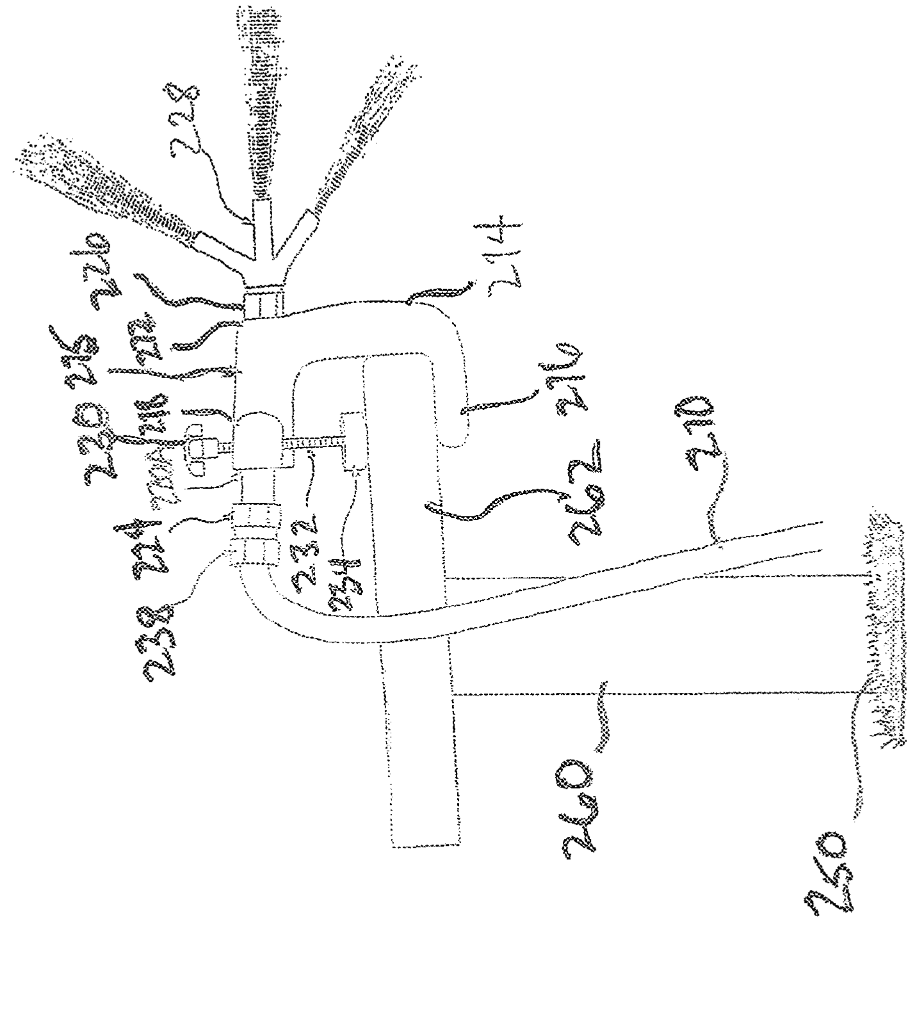
FIG. 9 depicts the attachment of the entire device of FIG. 7 to a water source and a horizontal solid base article for water delivery utilization thereof.

FIG. 9 shows the ability to position the device 300 of FIG. 7 on, in this instance, a vertical post 260, particularly, in this situation, a horizontal table top portion 262 thereof. The buttress arm 216 is placed on top of the table top 262 with the clamp 234 moved through the movable rod 222 through tightening of the head 230 until the buttress arm 216 and clamp 234 secure to the table top 262. The positioning of the device 300 in this manner allows, in this instance, the rotating sprinkler 228 to provide water at a height and in a direction as determined by the user. The water source 240 and the post 260 are on the ground 250, but the rotating sprinkler 228 is not, allowing for a unique manner of delivery water at such a location.

Such a versatile device that allows for a number of simultaneous benefits heretofore unexplored within this art. With the ability to manipulate and place such a water delivery device on demand, as well as to interchange the type of water delivery device on demand, a user has a broader spectrum to control and determine water delivery activities and targets for more efficient and effective results.

While the device has been particularly shown and described with reference to a preferred embodiment thereof, it will be understood by those skilled in the art that changes in form and detail may be made therein without departing from the spirit and scope of the disclosure.

What I claim is:

1. A water delivery device comprising an intermediary unitary structure having a three-dimensional configuration with i) an external arm including a top opening leading to an integrated channel housed within said external arm and a bottom opening present at the opposite end of said integrated channel, ii) a top arm perpendicular to said external arm, iii) a buttress arm extending perpendicularly from said top arm, iv) a further extending arm leading perpendicularly from said external arm including an opening for a movable/rotating shaft, v) a further external arm extension leading perpendiculary from said buttress arm, and vi) a movable/rotating shaft leading from said opening included on said further extending arm leading perpendicularly from said external arm, said movable/rotating shaft including a clamp end disposed between said for said movable/rotating shaft opening and said further external extension leading perpendicularly from said buttress arm and a tightening end present externally in relation to said opening for said movable/rotating shaft; wherein said top and bottom openings on said external arm allow for attachment of a water source and an adapter or direct connection of a water delivery component.

2. The device of claim 1 wherein said movable/rotating shaft is selected from a screw-on clamp and a pressure-based clamp and permits placement and secured attachment to a solid structure for versatile location of the overall device for water delivery in any direction and manner on demand.

3. The device of claim 1 wherein said water source is a hose.

4. The device of claim 1 wherein said water delivery component is selected from a sprinkling, rotating, and oscillating structure with openings for water egress therein.

* * * * *